A. M. MYERS.
PNEUMATIC TIRE.
APPLICATION FILED DEC. 1, 1917.
1,268,043.
Patented May 28, 1918.
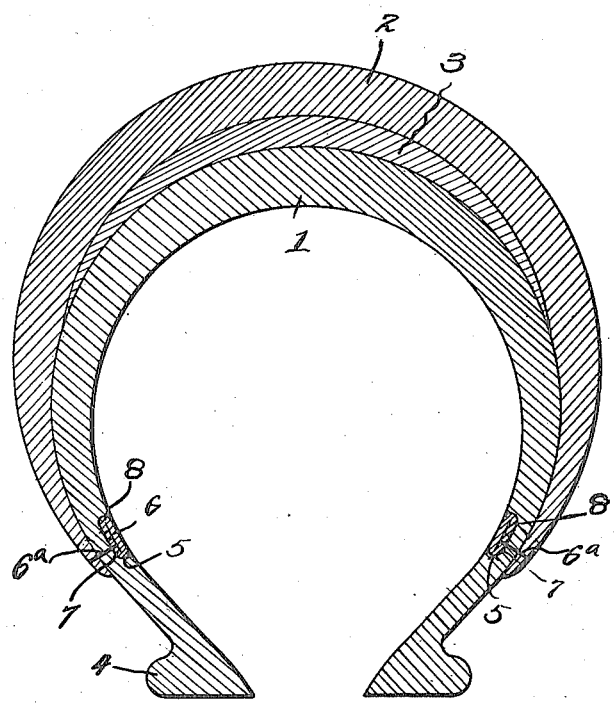
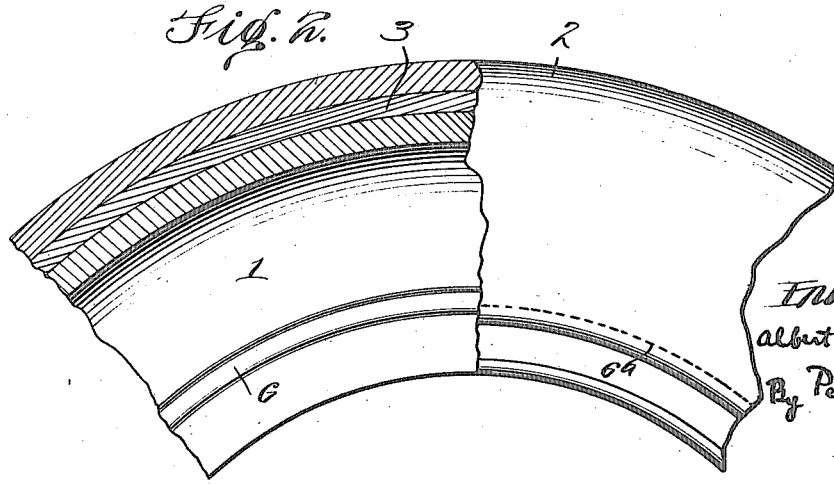

UNITED STATES PATENT OFFICE.

ALBERT M. MYERS, OF HARRISBURG, PENNSYLVANIA.

PNEUMATIC TIRE.

1,268,043.  Specification of Letters Patent.  Patented May 28, 1918.

Application filed December 1, 1917. Serial No. 204,813.

*To all whom it may concern:*

Be it known that I, ALBERT M. MYERS, a citizen of the United States of America, residing at Harrisburg, in the county of Dauphin and State of Pennsylvania, have invented certain new and useful Improvements in Pneumatic Tires, of which the following is a specification.

This invention relates to improvements in wheel tires, more especially of the pneumatic type.

The invention has for its object the provision of means whereby tires with worn treads can be repaired by applying new treads thereto, and particularly treads of other covers discarded owing to their having become rim cut.

Another object is to devise means for securing the treads in place which will be absolutely secure, which will not be affected by the action of the heat generated from the travel or traction of the wheel over the surface and which will not rub or mar the inner tube.

Other objects of the invention will be made apparent as the nature thereof is more fully seen from the following disclosure.

The invention therefore consists of certain instruments and features of construction substantially as hereinafter set forth and defined by the appended claims.

In the accompanying drawings is illustrated the preferred embodiment of my invention wherein it will be understood that various changes and modifications may be made as relates to details of construction and arrangement of parts without departing from the scope of the claims, and in which drawings:

Figure 1 is a transverse section of a portion of a pneumatic wheel-tire embodying my invention;

Fig. 2 is a fragmental portion of such a tire upon an enlarged scale, partly in side elevation and partly in section.

In carrying out my invention, I build the tire of preferably discarded or waste pieces of tire members 1 and 2; the third piece 3 being interposed between these latter, said pieces or members all being fixedly assembled and preferably vulcanized together with or without stitching or riveting along the edges thereof, this arrangement thus providing for utilizing as indicated, otherwise useless parts of worn-out tire members, the advantages of which, in the way of cheapening or lessening expense or purchase cost, are apparent. These several parts 1, 2 and 3 are preferably conformed to the outline disclosed by Fig. 1, imparting thereto a thickened central or tread portion, with inner tapering convergent end-portions, thus reinforcing the tire where the greatest wear is brought thereon, and providing for constricting or attenuating their convergent portions for facilitating attaching the outermost or tread member to the innermost bead equipped member, as clearly shown, the bead-terminals being designated as 4 and of the usual construction.

I provide herein means for attaching or connecting the outermost or tread member 2 to the innermost tire-member 1, which connection is effected by stitching or riveting as already indicated, at the inner edges of the tread member and adjacent the corresponding or beaded edges of said tire member. This means consists in providing for setting into the inner surface of the tire member in an annular groove or socket 5 therein, a piece of rubber or textile material, as canvas, 6, and stitching or riveting the same to the tire member and the outermost or tread member 2 as at $6^a$. The stitches or rivets are passed or directed through an inturned or folded under end portion or flap 7 of the rubber or textile piece 6, the other end portion or flap 8 of the latter being similarly folded within the socket, the body portion of said canvas or rubber piece thus being presented inwardly next to the inflatable tube (not shown) whereby the rivets or stitches of the connection will be isolated or partitioned off from contact with said tube and accordingly obviate the danger of rubbing a hole through the inner tube (not shown) due to friction. It is understood of course that the stitching or riveting, as at $6^a$, is performed before the body portion of the annular member 6 is inserted, with its end portion or flap 8 into the socket 5 of the tire member 1, the stitching or riveting operation being first effected through the end portion or flap 7, initially inserted into the socket, the other flap 8 then being folded inwardly upon the body portion, and the latter, with the flap thus disposed thereon, pressed into the socket, the whole thus being embedded in the tire as a protector or guard against the transmission of heat to the threaded or stitched connection, as above stated.

The tire thus produced is, by reason of the aforesaid structural features, characterized for durability, is inexpensive and possessed of extraordinary wearing qualities, as is thought has been made apparent.

I claim:

1. A wheel-tire, the inner member of which is provided with an annular member set into the inner wall thereof, for receiving the fastening or connecting means between said inner member and the outer member of the tire, adapted to guard or protect said fastening means from the heating action generated by the traction between the tire tread and the road or surface.

2. A wheel-tire, the inner member of which is provided with an annular member set into a socket in the inner wall of said inner member, said annular member receiving the fastening or connecting means between said inner member and the outer member of the tire and including a body portion with inwardly foldable end portions serving as flaps, one of said flaps providing for the passage of the fastening means therethrough and the other flap adapted to inwardly fold upon the body portion and the latter with the inwardly folded flap, adapted to be received within said socket and serve to guard or isolate said fastening means received by the aforesaid end flap.

3. A pneumatic wheel-tire provided with an annular member set into the inner wall of one member therefor for receiving the fastening threads between said member and the outer member of the tire, said annular member being adapted to prevent said fastening threads from rubbing the pneumatic tube and thus wearing punctures therethrough.

In testimony whereof I affix my signature in presence of two witnesses.

ALBERT M. MYERS.

Witnesses:
ELMER BALSER,
DAVID B. TROSTLE.